United States Patent [19]

Job

[11] Patent Number: 5,132,263

[45] Date of Patent: Jul. 21, 1992

[54] OLEFIN POLYMERIZATION CATALYST

[75] Inventor: Robert C. Job, Houston, Tex.

[73] Assignee: Shell Oil Company, Houston, Tex.

[21] Appl. No.: 749,806

[22] Filed: Aug. 26, 1991

Related U.S. Application Data

[62] Division of Ser. No. 600,781, Oct. 22, 1990, Pat. No. 5,066,737.

[51] Int. Cl.$^5$ .............................................. C08F 4/654
[52] U.S. Cl. .................................. 502/127; 502/111; 502/121; 502/123; 502/124; 502/125; 502/126; 502/128; 526/125
[58] Field of Search ............... 502/111, 121, 123, 124, 502/125, 126, 127, 128

[56] References Cited

U.S. PATENT DOCUMENTS

| 3,901,863 | 8/1975 | Berger et al. | 502/125 X |
|---|---|---|---|
| 4,330,649 | 5/1982 | Kioka et al. | 502/125 X |
| 4,472,521 | 9/1984 | Band | 502/127 X |
| 4,540,679 | 9/1985 | Arzoumanidis et al. | 502/111 |
| 4,710,482 | 12/1987 | Job | 502/127 |
| 4,728,705 | 3/1988 | Nestlerode et al. | 526/125 |
| 4,902,761 | 2/1990 | Suga et al. | 502/125 X |
| 4,935,394 | 6/1990 | Chang | 502/125 X |
| 4,985,515 | 1/1991 | Matsuura et al. | 526/125 |

Primary Examiner—Patrick P. Garvin

[57] ABSTRACT

A complex, magnesium-containing, titanium-containing solid olefin polymerization procatalyst precursor is produced by reaction of magnesium alkoxide, titanium tetraalkoxide and a phenolic compound followed by removal of alkanol. Conversion of this solid to an olefin polymerization procatalyst and the procatalyst to an olefin polymerization catalyst results in a catalyst which is used to polymerize lower α-olefin monomers. The polymer product is obtained in good yield and has good properties including a relatively high bulk density and a relatively narrow particle size distribution.

27 Claims, No Drawings

OLEFIN POLYMERIZATION CATALYST

This is a division, of application Ser. No. 07/600,781, filed Oct. 22, 1990 and now U.S. Pat. No. 5,066,737.

FIELD OF THE INVENTION

This invention relates to high activity olefin polymerization catalysts, a method for the production thereof, and the use of such catalysts in the polymerization of olefins. More particularly, the invention relates to a magnesium-containing, titanium-containing solid precursor of an olefin polymerization catalyst component, to the component and to the resulting olefin polymerization catalyst.

BACKGROUND OF THE INVENTION

The production of polymers or copolymers of lower α-olefins, particularly ethylene and propylene, has gained substantial commercial acceptance. The polymeric products are inexpensive and exhibit a number of commercially useful properties. In the case of the polymerization of ethylene, the process is relatively uncomplicated in that the product type is not influenced by the manner in which the ethylene molecules add to the growing polymeric chain and the polymeric product does not exist in stereoisomeric forms.

In the case of the polymerization of propylene, however, the presence of pendant methyl groups on the polymeric chain provides the possibility of several types of product depending upon the steric regularity with which the propylene units add to the growing polymer chain. Much, if not most, of the commercial polypropylene is crystalline and results from the stereoregular addition of propylene units in a regular head-to-tail manner. The polypropylene in which the addition of propylene units is random is termed atactic. This amorphous form is less desirable and, if present in significant quantities, must be removed as by extraction in order to obtain a more desirable crystalline product.

Also significant from a commercial standpoint is the activity of the polymerization catalyst. A number of the early polymerization catalysts, e.g., trivalent titanium, chromium or vanadium catalysts, were of relatively low activity and the polyolefin product contained a significant proportion of catalyst residues. The removal of such residues as by a deashing step was required in order to obtain a product of commercially acceptable properties. The more recent olefin polymerization catalysts are stereoregular and of sufficient catalytic activity so that extraction and/or deashing steps are not required.

In the terms now conventionally employed for the components, the high activity olefin polymerization catalysts are formed from a procatalyst which typically contains magnesium, titanium and halide moieties as well as an electron donor, a cocatalyst which is usually an organoaluminum compound and a selectivity control agent which may be provided as a partial or total complex with the cocatalyst. Although each of the components has a considerable influence on the polymerization catalyst and process and the polymer product obtained therefrom, the nature of the catalyst as well as the polymerization product seems to be most influenced by the procatalyst. Much of the research directed toward improvement of the olefin polymerization process has been directed toward improvement of the procatalyst component.

Kioka et al, U.S. Pat. No. 4,300,649, describe a solid catalyst component (procatalyst) obtained by heating a soluble magnesium compound such as magnesium chloride with an alkanol of at least 4 carbon atoms in the presence of an ester to produce a solution which is added to titanium tetrachloride and an electron donor to form a procatalyst. Band, U.S. Pat. No. 4,472,521, reacts a magnesium alkoxide with a titanium alkoxide of 4 or more carbon atoms in each alkoxide moiety in the presence of aromatic hydrocarbon. Titanium tetrachloride and an electron donor are added to the resulting solution to form a procatalyst which is post-treated with transition metal halide. Arzoumandidis et al, U.S. Pat. No. 4,540,679, produce a catalyst component by contacting a suspension of magnesium ethoxide in ethanol with carbon dioxide. The addition of an organoaluminum compound in hydrocarbon solvent to the resulting solution produces spherical particles which are employed as a support for titanium moieties upon treatment with titanium tetrachloride. Nestlerode et al, U.S. Pat. No. 4,728,705, solubilize magnesium ethoxide in ethanol with carbon dioxide and spray dry the resulting solution or alternatively use the solution to impregnate catalyst particles. The particles resulting from either modification are useful in the production of a procatalyst of desirable morphology.

A somewhat different type of catalyst component precursor is described by Job, U.S. Pat. No. 4,710,482, wherein a crystalline magnesium compound of the general formula

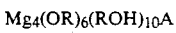

$$Mg_4(OR)_6(ROH)_{10}A \qquad (I)$$

is formed in which R independently is lower alkyl of up to 4 carbon atoms inclusive and A is one or more anions including halide anions or anions of polyhydric phenols having a total oxidation state of −2. This insoluble complex magnesium compound is contacted with a tetravalent titanium halide, a halohydrocarbon and an electron donor to form an olefin polymerization procatalyst. Such complex magnesium compounds are precipitated from solutions in methanol and are converted to procatalysts and then to olefin polymerization catalysts by largely conventional technology. The catalysts so produced are good high activity polymerization catalysts, particularly for the polymerization or copolymerization of propylene. It would be of advantage, however, to provide improved olefin polymerization catalysts.

SUMMARY OF THE INVENTION

The present invention provides solid, magnesium-containing, titanium-containing complexes which are precursors of olefin polymerization procatalysts. More particularly, the invention provides such procatalyst precursors, the procatalysts produced therefrom and the olefin polymerization catalysts obtained from those procatalysts. The invention also relates to the process of polymerization lower α-olefins in the presence of such catalysts to obtain polymer product of good properties in good yield. The polymer product is further characterized by a relatively narrow particle size distribution and a relatively high bulk density.

DESCRIPTION OF THE INVENTION

The present invention contemplates the production of a complex containing magnesium, titanium and alkoxide moieties as well as moieties of a phenolic compound. This complex is then reacted with a magnesium halide alcoholate to produce an initial solution from which, upon further heating, a granular solid precipitates. From this solid is produced an olefin polymerization procatalyst by contacting the solid with a tetravalent titanium halide, a halohydrocarbon and an electron donor. The procatalyst is contacted with an organoaluminum cocatalyst and a selectivity control agent to produce a high activity olefin polymerization catalyst.

The procatalyst precursor is produced in a two-step synthesis initially involving the reaction of a magnesium alkoxide, i.e., $Mg(OR)_2$, and a titanium tetraalkoxide, i.e., $Ti(OR)_4$, in which the alkoxide moieties independently have up to 4 carbon atoms, with certain phenolic compounds. The alkoxide moieties of the two metal alkoxide reactants are the same or are different, as are the alkoxide moieties within an individual alkoxide reactant. The group OR is illustrated by methoxide, ethoxide, n-propoxide and n-butoxide but the preferred R group is ethyl and thus the preferred OR group is ethoxide.

The phenolic compound utilized as an initial reactant is selected from phenol or activating group-substituted phenol. By the term "activating group" is meant a ring carbon atom substituent free from active hydrogen atoms which is ortho-para directing relative to further aromatic ring substitution and which is generally but not invariably electron donating. Illustrative of such activating groups are alkyl of up to 5 carbon atoms, e.g., methyl, ethyl, isopropyl or t-butyl; alkoxy of up to 5 carbon atoms, e.g., methoxy, ethoxy, butoxy or amyloxy; halo, particularly chloro or bromo; and dialkylamino wherein each alkyl has up to 5 carbon atoms such as dimethylamino and diethylamino. Exemplary phenolic compounds included as reactants within the production of the original complex are phenol, p-cresol, 3-methoxyphenol, 4-dimethylaminophenol, 2,6-dimethylphenol and 2,6-di-t-butyl-4-methylphenol. Of such phenolic compounds, o-cresol is preferred.

The initial reaction takes place in an inert reaction diluent by contacting magnesium alkoxide, titanium alkoxide and the phenolic compound at an elevated temperature. Reaction diluents that are suitable are inert towards the reactants and relatively high boiling so as to be liquid at the temperature of the contacting. Diluents such as chlorobenzene, toluene and isooctane are suitable. Chlorobenzene is preferred. The temperature of the contacting is from about 60° C. to about 130° C. at a pressure sufficient to maintain the reaction mixture in a liquid phase. The initial product is a stoichiometric complex of the starting materials illustrated but not limited by the formula

$$Mg_3Ti(phenolate)_2(OR)_8 \qquad (II)$$

wherein R has the previously stated meaning and phenolate is the anion corresponding to the phenolic compound reactant. This product is a clear solution in the reaction diluent employed in its production.

This initial complex is then contacted with a magnesium halide alcoholate, preferably a hexaalcoholate, in which the alcohol moieties are of the formula ROH wherein R has the previously stated meaning. The magnesium halide is preferably a magnesium chloride or a magnesium bromide but a magnesium chloride is particularly preferred. The initial complex and the magnesium halide alcoholate are mixed in an inert reaction diluent which is the same as the diluent used in the production of the initial complex or is different by virtue of the addition of a co-diluent or by diluent exchange. Preferably, the diluent is the same and the second synthetic procedure comprises the addition of the magnesium halide alcoholate to the product mixture containing the initial complex. The reactants are contacted and heated at a relatively mild temperature, e.g., up to about 100° C., until a clear solution has been obtained and then heated at a higher temperature, from about 110° C. to about 140° C. for example, to remove ethanol from the reaction mixture, typically as an azeotrope with a portion of the reaction diluent. This ethanol removal is accompanied by the formation of opaque, spheroidal particles and typically ethanol is removed until the production of such particles ceases. These particles, of somewhat variable composition depending in part on the composition of the initial complex, are solid, magnesium-containing, titanium-containing precursors of the olefin polymerization procatalyst.

The procatalyst precursors are converted to olefin polymerization procatalysts by treatment with a tetravalent titanium halide, an optional halohydrocarbon and an electron donor. The tetravalent titanium halide is suitably an aryloxy- or alkoxy- di- or tri-halide such as diethoxytitanium dichloride, dihexoxytitanium dibromide, isopropoxytitanium chloride or phenyltitanium chloride, or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional halohydrocarbon employed in the production of the olefin polymerization procatalyst is an inert halohydrocarbon of up to 12 carbon atoms inclusive, preferably of up to 9 carbon atoms inclusive, which contains at least one halogen atom and in the case of aliphatic halohydrocarbons contains at least two halogen atoms. Exemplary aliphatic halohydrocarbons include methylene chloride, methylene bromide, chloroform, carbon tetrachloride, 1,2-dibromoethane, 1,1,3-trichloropropane, 1,1,2-trichloroethane, trichlorocyclohexane, dichlorofluoromethane and tetrachlorooctane. Aromatic hydrocarbons suitably employed include chlorobenzene, bromobenzene, dichlorobenzene and chlorotoluene. Of the aliphatic halohydrocarbons, carbon tetrachloride and 1,1,2-trichloroethane are preferred but particularly preferred is the aromatic halohydrocarbon chlorobenzene.

The electron donors which are suitably employed in procatalyst production are the generally conventional electron donors used in titanium-based procatalysts and are free of active hydrogen atoms. Such electron donors include ethers, esters, imines, amides, nitriles, phosphines, arsines and stibines. The preferred electron donors are esters, particularly alkyl esters of aromatic monocarboxylic and dicarboxylic acids. Examples of the preferred electron donors are methyl benzoate, ethyl benzoate, ethyl p-ethoxybenzoate, ethyl p-methylbenzoate, diethyl phthalate, dimethyl naphthalenedicarboxylate, diisobutyl phthalate and diisopropyl terephthalate. The electron donor is a single compound or a mixture of compounds but preferably the electron donor is a single compound. Of the ester electron donors, ethyl benzoate and diisobutyl phthalate are particularly preferred.

The precise manner in which the procatalyst components are contacted is material but is not critical and is generally according to known procedures. In one embodiment, the tetravalent titanium halide is added to a mixture of the electron donor and the solid procatalyst precursor. Alternatively, the electron donor is added to the solid catalyst precursor and the resulting mixture is added to the tetravalent titanium halide. Best results seem to be obtained when the solid procatalyst precursor is contacted with a solution of the electron donor in a mixture of the tetravalent titanium halide and the halohydrocarbon. This initial contacting is typically followed by additional treatment with mixed halohydrocarbon and tetravalent titanium halide which optionally includes an aromatic acid halide such as phthaloyl chloride or benzoyl chloride to facilitate the conversion of some or all of the alkoxide moieties of the procatalyst precursor to halide moieties. This conversion, conventionally termed as halogenation, is known in the art. The solid product which results is generally washed at least once with light hydrocarbon such as isopentane or isooctane to remove unreacted titanium compounds and is then often dried. In the above contacting the tetravalent titanium halide and the halohydrocarbon are employed in molar excess relative to the titanium and sufficient electron donor is utilized to provide from about 0.01 mole to about 10 moles of electron donor per mole of titanium in the solid procatalyst, preferably from about 0.2 mole to about 1 mole of electron donor per mole of titanium.

The resulting procatalyst is a solid and is storage stable in the absence of oxygen and active hydrogen compounds. Alternatively, the procatalyst is used as obtained from the light hydrocarbon washing without the need for drying. This procatalyst is used to produce olefin polymerization catalyst by contact with an organoaluminum cocatalyst and a selectivity control agent.

The cocatalyst component of the olefin polymerization catalyst is an organoaluminum compound selected from the cocatalysts which are conventionally employed with titanium-based procatalysts. Illustrative organoaluminum cocatalysts are trialkylaluminum compounds, alkylaluminum alkoxide compounds and alkylaluminum halide compounds, where each alkyl independently has from 2 to 6 carbon atoms inclusive. The preferred organoaluminum compounds are free of halogen and particularly preferred are trialkylaluminum compounds such as triethylaluminum, triisopropylaluminum, triisobutylaluminum and diethylhexylaluminum. Triethylaluminum is a preferred trialkylaluminum cocatalyst. The organoaluminum compound cocatalyst, during formation of the olefin polymerization catalyst, is employed in sufficient quantity to provide from about 1 mole to about 150 moles of aluminum per mole of titanium of the procatalyst. Preferred quantities of the cocatalyst are sufficient to provide from about 10 moles to about 100 moles of aluminum per mole of titanium in the procatalyst.

The selectivity control agents which are used in the production of the olefin polymerization catalysts are those selectivity control agents conventionally employed in conjunction with titanium-based procatalysts and organoaluminum cocatalysts. Illustrative of useful selectivity control agents are those classes of electron donors employed in procatalyst production as described above as well as organosilane compounds including alkylalkoxysilane compounds and arylalkoxysilane compounds of the formula $$R'_r Si(OR)_{4-r} \quad \text{(III)}$$

wherein R' independently is alkyl or aryl of up to 10 carbon atoms, R independently has the previously stated meaning and r is 1 or 2. The preferred selectivity control agents are esters of aromatic monocarboxylic and dicarboxylic acids, particularly alkyl esters such as ethyl p-ethoxybenzoate, diisobutyl phthalate, ethyl benzoate and ethyl p-methylbenzoate, or the preferred selectivity control agents are alkylalkoxysilane compounds such as diethyldiethoxysilane, diisobutyldimethoxysilane, propyltrimethoxysilane or cyclohexylmethyldimethoxysilane. In one modification, the selectivity control agent is the electron donor provided during the production of procatalyst. In an alternate modification, the selectivity control agent is provided at the time of the contacting of procatalyst, cocatalyst and selectivity control agent. In either modification, the selectivity control agent is provided in a quantity from about 0.1 mole to about 100 moles per mole of titanium of the procatalyst. Preferred quantities of selectivity control agent are from about 0.5 mole to about 25 moles per mole of titanium of the procatalyst.

The method of contacting the procatalyst, cocatalyst and selectivity control agent to provide the olefin polymerization catalyst is not critical. In one modification the olefin polymerization catalyst components are simply mixed in a suitable reactor and the preformed catalyst thereby produced is introduced into a polymerization reactor when the initiation of olefin polymerization is desired. In an alternate modification, the catalyst components are introduced into the polymerization reactor where the olefin polymerization catalyst is formed in situ.

The olefin polymerization catalyst formed from the complex, solid olefin procatalyst precursor by way of the procatalyst is useful in the polymerization under polymerization conditions of lower α-olefins and particularly in the polymerization of straight-chain α-olefins of up to 4 carbon atoms inclusive, i.e., ethylene, propylene and 1-butene or mixtures thereof. The precise procedures and conditions of the polymerizations are broadly conventional but the olefin polymerization process, because of the use therein of a polymerization catalyst formed ultimately from the solid procatalyst precursor, provides polyolefin product and particularly polypropylene product having a relatively high bulk density and a relatively narrow particle size distribution in quantities which reflect the relatively high productivity of the olefin polymerization process. The polymer product is suitably a homopolymer as when a single α-olefin monomer is supplied to the polymerization process. Alternatively, the catalyst and process of the invention are suitable for the production of copolymers including copolymers of ethylene and propylene such as EPR and polypropylene impact copolymer as when two or more α-olefin monomers are supplied to the polymerization process.

Polymerization is suitably conducted under polymerization conditions in a gas-phase process employing one or more fluidized beds of catalyst or is employed in a slurry-phase process incorporating as a diluent an inert material such as propane or a liquified monomer of the polymerization such as propylene. The molecular weight of the polymeric product is suitably influenced by the provision of molecular hydrogen to the polymerization system as is known in the art. The polymerization process is conducted in a batchwise manner or in a continuous or semi-continuous manner with constant or intermittent addition of catalyst or catalyst components as well as additional monomer reactant to the polymerization reactor.

In general, the productivity of an olefin polymerization catalyst exhibits an inverse relationship with selectivity so that many highly active polymerization catalysts have a good productivity but a relatively low stereospecificity. The catalysts of the invention exhibit good productivity while retaining desirably high stereospecificity so that the polymer product obtained by the use of such catalyst in the process of the invention has good properties without the need for an extraction or a deashing step.

The invention is further illustrated by the following Illustrative Embodiments which should not be regarded as limiting.

Illustrative Embodiment I

A solution containing approximately 1% by weight magnesium was prepared by mixing 36 g (0.31 mole) of magnesium ethoxide, 25.2 g of 95% titanium tetraethoxide (0.105 mole) and 22.7 g (0.21 mole) of o-cresol in 670 g of chlorobenzene in a sealed container and stirring the mixture overnight while the container was immersed in a 130° C. oil bath. The molar ratio of cresol/magnesium/titanium in the solution was 2/3/1.

In an 8-ounce bottle, 128.6 g of this solution was mixed with 7.3 g of $MgCl_2.6$ EtOH (19.6 mmol) and 86 g of chlorobenzene. The bottle and contents were placed in a 95° C. oil bath and the contents were stirred for 2 hours at 450 rpm. The oil bath was then raised to 105° C. and the clear mixture was stirred overnight. The resulting slurry was filtered while warm and the recovered solids were washed once with chlorobenzene and once with isooctane and then dried under flowing nitrogen. A yield of 6.8 g of solids in the form of spheroids was obtained.

Illustrative Embodiment II

Employing the procedure of Illustrative Embodiment I, a solution containing a molar ratio of cresol/magnesium/titanium of 1/3/1 was prepared in chlorobenzene from 53.6 mmol of magnesium ethoxide, 17.9 mmol of titanium tetraethoxide and 17.9 mmol of o-cresol. In an 8-ounce bottle 43.55 g of this solution was mixed with 7.3 g (19.6 mmol) of $MgCl_2.6$ EtOH and 86 g of chlorobenzene. The bottle was capped. The bottle and the slurry it contained were placed in a 90° C. oil bath and the contents were stirred at 450 rpm. After 20 minutes, a clear solution was observed in the bottle. After 2 hours the bottle was uncapped. Some foaming was observed and the temperature of the oil bath was raised to 93° C. After stirring overnight, the resulting slurry was filtered while warm and the solids washed once with warm chlorobenzene and then with cool chlorobenzene, washed twice with isooctane and dried under flowing nitrogen. A yield of 9.4 g of cream colored solid in the form of rough spheroids was obtained.

Illustrative Embodiment III

A solution containing a 0.5/3/1.5 molar ratio of cresol/magnesium/titanium was prepared according to the procedure of illustrative Embodiment I by mixing 53.8 mmol of magnesium ethoxide, 26.9 mmol of titanium tetraethoxide and 9 mmol of o-cresol in chlorobenzene to a total weight of 43.5 gm. In an 8-ounce bottle, this solution was mixed with 7.6 g (20.4 mmol) of $MgCl_2.6$ EtOH, 60 g of isooctane and 32 g of chlorobenzene. The bottle was capped and the bottle and contents were placed in a 70° C. oil bath while the contents were stirred at 440 rpm. After 15 minutes, a clear solution was obtained. The mixture was stirred overnight and a small amount of a yellow precipitate was obtained. The bottle was uncapped and the oil bath temperature was raised to 103° C. After 5 hours the resulting slurry was filtered while warm and the recovered solid was washed once with warm 2/1 by volume isooctane/chlorobenzene and once with isooctane and then dried under flowing nitrogen. The yield was 12.3 g of cream colored solids comprising opaque spheroids in the 10–30 micron size range.

Illustrative Embodiment IV

Olefin polymerization procatalysts were produced from each of the solid products of Illustrative Embodiments I-III. Sufficient amounts of each product to provide from about 30 mmol to about 50 mmol of magnesium was digested at 115° C. for about 60 minutes with 150 ml of a 50/50 by volume mixture of chlorobenzene and titanium tetrachloride and enough diisobutyl phthalate to give a concentration of about 40 mmol/liter. The resulting solid was washed for about 30 minutes with 150 ml of fresh 50/50 solution containing 6 mmol/liter of phthaloyl chloride. A second wash was then conducted for 30 minutes using fresh 50/50 chlorobenzene/titanium tetrachloride solution. The resulting solid was then washed once with isooctane at 90° C. and twice with isooctane at room temperature and then dried in nitrogen at 50° C. Each procatalyst was then analyzed to determine the elemental composition. The results are shown in Table I in terms of the Illustrative Embodiment used to form the procatalyst precursor.

TABLE I

| Illustrative Embodiment | Composition, % wt | | |
|---|---|---|---|
| | Ti | Mg | Cl |
| I | 2.40 | 18.7 | 60.0 |
| II | 2.25 | 16.0 | 57.7 |
| III | — | — | 59.0 |

Illustrative Embodiment V

The olefin polymerization procatalysts of Illustrative Embodiment IV were converted to olefin polymerization catalysts by contact with triethylaluminum as cocatalyst and diisobutyldimethoxysilane as selectivity control agent. The catalysts were then employed to polymerize propylene in a slurry-phase process employing liquid propylene as diluent. The cocatalyst, selectivity control agent and procatalyst were mixed in proportions to give a Al/Si/Ti ratio of 70/20/1. The mixing took place about 20 minutes prior to the injection of the catalyst into the polymerization reactor which had been heated to about 65° C. The results of the polymerizations are shown in Table II where Productivity refers to the kg of polymer product per gram of procatalyst per hour. The term "XS" refers to the xylene soluble content of the polymer, which relates to the stereospecificity of the catalyst, in accordance with the regulations of the U.S. Food and Drug Administration. The test for xylene solubles is conducted by dissolving the polymer in xylene under reflux. The flask containing the dissolved polymer is then immersed in a water bath at 25° C. and maintained without stirring for 1 hour, during which the insoluble portion precipitates. The precipitate is removed by filtration and an aliquot of the filtrate is evaporated and the residue is dried and weighed. This residue determines the xylene solubles content. In Table II, the term BD measures the bulk density of the polymer product in g/cc.

TABLE II

| Illustrative Embodiment Source | Productivity kg/g cat hr | XS, % | BD g/cc |
|---|---|---|---|
| I | 41.3 | 3.3 | 0.348 |
| II | 38.8 | 3.2 | 0.366 |
| IIIa | 39.6 | 2.8 | 0.349 |
| IIIb* | 37.8 | 3.0 | 0.407 |

*Catalyst injected into reactor at room temperature and the reaction mixture heated to 67° C. over 15 minutes.

Illustrative Embodiment VI

The particle size of the polymer products produced by use of catalysts originating with the solids of Illustrative Embodiments II and III was determined by measuring the proportions of polymer particles that are retained by various sizes of wire screen, measured in microns. This method is conventional for the determination of weight average particle size (WAPS) and number average particle size (NAPS). The ratio of these values, WAPS/NAPS, is a measure of the particle size distribution with the smaller numbers reflecting more narrow particle size distribution. For the polymerization employing a catalyst originating from the product of Illustrative Embodiment II, the value for WAPS was 804.3 microns and WAPS/NAPS was 1.06. For the "a" polymerization originating with the product of Illustrative Embodiment III, the value for WAPS was 725 microns and the WAPS/NAPS ratio was 0.99.

For the product of a conventional propylene polymerization employing a titanium-based catalyst, a typical value for WAPS is about 800 microns and for WAPS/NAPS is about 1.4.

What is claimed is:

1. A solid olefin polymerization procatalyst precursor containing moieties of magnesium and titanium moieties produced by (1) reacting magnesium alkoxide wherein each alkoxide independently has up to 4 carbon atoms, titanium tetraalkoxide wherein each alkoxide has up to 4 carbon atoms and a phenolic compound selected from phenol or phenol substituted with a group free from active hydrogen atoms and which is ortho-para directing relative to aromatic ring substitution, (2) reacting the resulting product with a magnesium halide alcoholate wherein the alcohol moieties are alkanol moieties having up to 4 carbon atoms inclusive and (3) removing alkanol from the resulting product mixture.

2. The precursor of claim 1 wherein each alkoxide is ethoxide.

3. The precursor of claim 2 wherein the magnesium halide alcoholate is magnesium chloride hexaethanolate.

4. The precursor of claim 3 wherein the phenolic compound is o-cresol.

5. An olefin polymerization procatalyst produced by contacting the procatalyst precursor of claim 1 with a tetravalent titanium halide, a halohydrocarbon and an electron donor.

6. The procatalyst of claim 5 wherein the tetravalent titanium halide is titanium tetrahalide.

7. The procatalyst of claim 6 wherein the electron donor is an alkyl ester of an aromatic monocarboxylic or dicarboxylic acid.

8. The procatalyst of claim 7 wherein the titanium tetrahalide is titanium tetrachloride.

9. The procatalyst of claim 8 wherein the halohydrocarbon is chlorobenzene.

10. The procatalyst of claim 9 wherein the ester is ethyl benzoate or diisobutyl phthalate.

11. An olefin polymerization procatalyst produced by contacting the procatalyst precursor of claim 4 with titanium tetrachloride, a halohydrocarbon and an alkyl ester of an aromatic monocarboxylic or dicarboxylic acid.

12. The procatalyst of claim 11 wherein the ester is ethyl benzoate or diisobutyl phthalate.

13. The procatalyst of claim 12 wherein the halohydrocarbon is chlorobenzene.

14. The procatalyst of claim 13 wherein the ester is ethyl benzoate.

15. The procatalyst of claim 13 wherein the ester is diisobutyl phthalate.

16. The olefin polymerization catalyst obtained by contacting the procatalyst of claim 5 with an organoaluminum compound cocatalyst and a selectivity control agent.

17. The catalyst of claim 16 wherein the cocatalyst is trialkylaluminum.

18. The catalyst of claim 17 wherein the selectivity control agent is an alkyl ester of an aromatic monocarboxylic or dicarboxylic acid or an organosilane compound of the formula $$R'_r Si(OR)_{4-r}$$

wherein R' independently is alkyl or aryl of up to 10 carbon atoms inclusive, R independently is alkyl of up to 4 carbon atoms inclusive and r is 1 or 2.

19. The catalyst of claim 18 wherein the selectivity control agent is an ester.

20. The catalyst of claim 19 wherein the trialkylaluminum is triethylaluminum.

21. The catalyst of claim 20 wherein the ester is ethyl p-ethoxybenzoate.

22. The catalyst of claim 20 wherein the ester is diisobutyl phthalate.

23. The catalyst of claim 18 wherein the selectivity control agents is an organosilane.

24. The catalyst of claim 23 wherein the trialkylaluminum is triethylaluminum.

25. The catalyst of claim 24 wherein the organosilane is diisobutyldimethoxysilane.

26. The catalyst of claim 24 wherein the organosilane is propyltrimethoxysilane.

27. The catalyst of claim 24 wherein the organosilane is cyclohexylmethyldimethoxysilane.

* * * * *